United States Patent
Nair et al.

(10) Patent No.: US 8,855,679 B2
(45) Date of Patent: Oct. 7, 2014

(54) METHOD AND SYSTEM FOR POPULATING LOCATION-BASED INFORMATION

(75) Inventors: Vimal Nair, Sunnyvale, CA (US); Sudhakar Aramalla, Sunnyvale, CA (US); Agnes Tang, San Jose, CA (US); Roongko Doong, Palo Alto, CA (US); Justin Basanese, Los Gatos, CA (US); Oluwatosin Aduroja, Sunnyvale, CA (US); Dang Le, San Jose, CA (US); Christopher Thomas, Richmond, CA (US); Kit Prud'homme, Sunnyvale, CA (US); Manish Patel, San Jose, CA (US); Manshan Wong, Fremont, CA (US)

(73) Assignee: QUALCOMM Incorporated, San Diego, CA (US)

( * ) Notice: Subject to any disclaimer, the term of this patent is extended or adjusted under 35 U.S.C. 154(b) by 14 days.

(21) Appl. No.: 13/013,851

(22) Filed: Jan. 26, 2011

(65) Prior Publication Data

US 2012/0190385 A1 Jul. 26, 2012

(51) Int. Cl.
*H04W 24/00* (2009.01)
*H04W 4/04* (2009.01)

(52) U.S. Cl.
CPC .................................... *H04W 4/043* (2013.01)

USPC ................. 455/456.3; 455/412.1; 455/414.2; 455/414.3; 455/456.1; 455/456.2

(58) Field of Classification Search
USPC .............. 455/412.1–414.4, 456.1–456.3, 457
See application file for complete search history.

(56) References Cited

U.S. PATENT DOCUMENTS

| | | | |
|---|---|---|---|
| 7,071,842 B1 * | 7/2006 | Brady, Jr. | 340/988 |
| 2004/0203863 A1 * | 10/2004 | Huomo | 455/456.1 |
| 2008/0113673 A1 * | 5/2008 | Brown et al. | 455/456.1 |
| 2008/0147730 A1 * | 6/2008 | Lee et al. | 707/104.1 |
| 2008/0268876 A1 * | 10/2008 | Gelfand et al. | 455/457 |
| 2010/0093365 A1 | 4/2010 | Bloebaum | |
| 2010/0161507 A1 | 6/2010 | McKenzie | |
| 2010/0287024 A1 | 11/2010 | Ward et al. | |
| 2011/0185029 A1 * | 7/2011 | Jain et al. | 709/207 |

* cited by examiner

*Primary Examiner* — Dai A Phuong
(74) *Attorney, Agent, or Firm* — Fulbright & Jaworski LLP (57) ABSTRACT

Embodiments of the present invention disclose a method and system for populating location-based information on a portable electronic device. According to one embodiment, a request to create a memory record on the portable electronic device is received from a user. Based on the geographic location of the portable electronic device, relevant location information associated with a plurality of reference fields of the memory record are determined and displayed on the portable electronic device.

11 Claims, 9 Drawing Sheets

METHOD AND SYSTEM FOR POPULATING LOCATION-BASED INFORMATION

BACKGROUND

The emergence and popularity of mobile computing has made various types of portable electronic devices a staple in today's marketplace. In addition to mobile networking, many mobile devices are now equipped with the technological capabilities for enabling rich location-based services. For example, global positioning and compass sensors are often included in such devices for communicating the geographic location and/or the facing direction of the user, respectively. Furthermore, modern high-speed wireless networks are capable of delivering rich media, software downloads, documents and similar content across the internet. However, due to the copious amounts of information available on the internet accompanied with the limited memory size of most mobile devices, providing an efficient data organization system on the device has proven to be a challenging task.

BRIEF DESCRIPTION OF THE DRAWINGS

The features and advantages of the inventions as well as additional features and advantages thereof will be more clearly understood hereinafter as a result of a detailed description of particular embodiments of the invention when taken in conjunction with the following drawings in which:

FIG. 2A is a three-dimensional view of an operating environment utilizing the location-based information populating system, while

DETAILED DESCRIPTION OF THE INVENTION

The following discussion is directed to various embodiments. Although one or more of these embodiments may be discussed in detail, the embodiments disclosed should not be interpreted, or otherwise used, as limiting the scope of the disclosure, including the claims. In addition, one skilled in the art will understand that the following description has broad application, and the discussion of any embodiment is meant only to be an example of that embodiment, and not intended to intimate that the scope of the disclosure, including the claims, is limited to that embodiment. Furthermore, as used herein, the designators "A", "B" and "N" particularly with respect to the reference numerals in the drawings, indicate that a number of the particular feature so designated can be included with examples of the present disclosure. The designators can represent the same or different numbers of the particular features.

The figures herein follow a numbering convention in which the first digit or digits correspond to the drawing figure number and the remaining digits identify an element or component in the drawing. Similar elements or components between different figures may be identified by the user of similar digits. For example, 143 may reference element "43" in FIG. 1, and a similar element may be referenced as 243 in FIG. 2. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

One solution to the aforementioned problem involves the use of Personal Information Management (PIM) application software. Devices, such as personal organizers, enabled with PIM software allow users to track and manage various types of personal information. Generally, traditional PIM-related actions involve a user opening a new contact or other PIM item, and manually entering the desired information into the device. As the amount of data required for management continues to grow, however, a more robust and expedited data entry method is sought.

Examples of the present invention provide a method and system for populating location-based information on a portable electronic device. According to one example, a user operating the portable electronic device may submit a request to create and store a new memory record on the portable electronic device. Based on the geographic location of the portable electronic device, relevant location information is discovered and displayed on the portable electronic device. This information may then be saved on the device for future reference. That is, location-based information such as the address location, website, phone number, business hours, reviews, and the like may be populated within a memory record based on the acquired geographic location of the portable electronic device.

Figure 1:
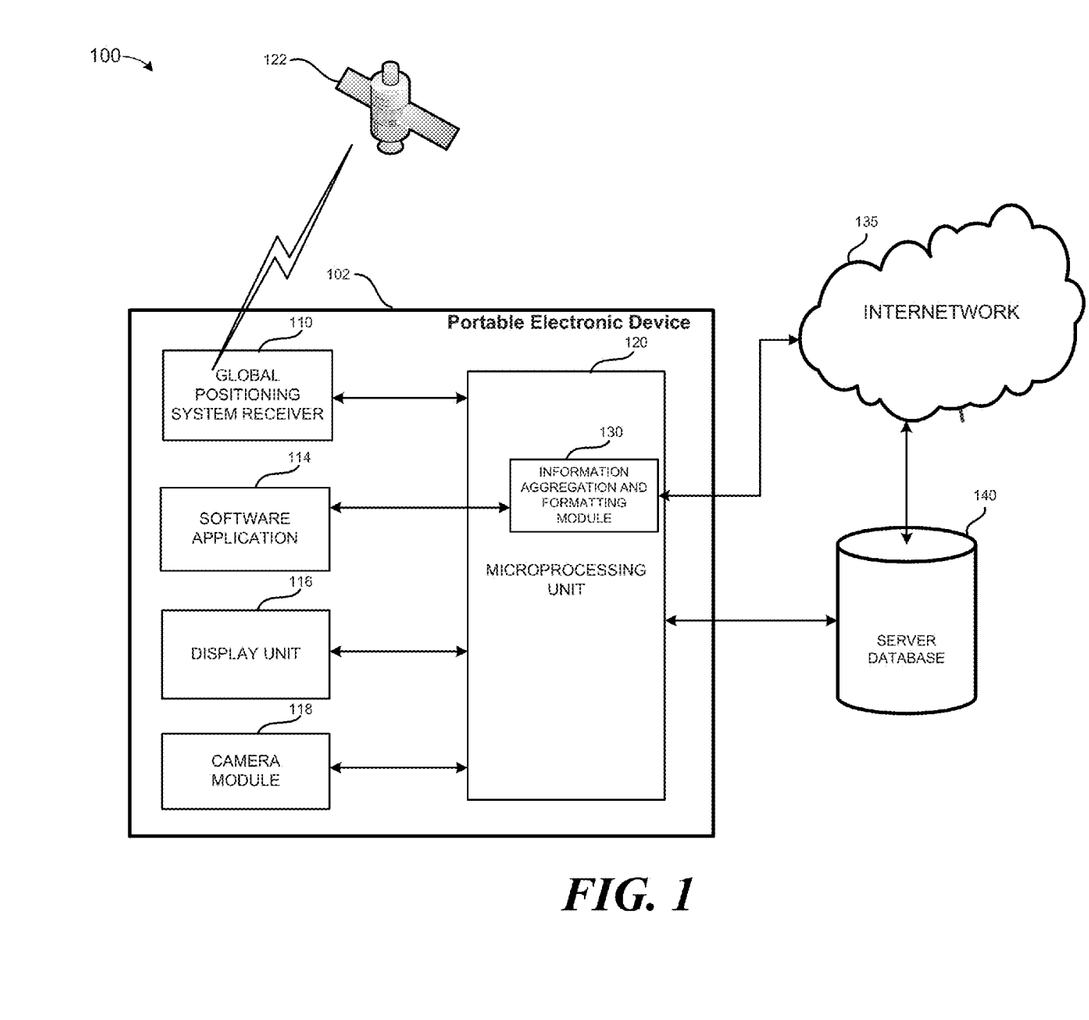
FIG. 1 is a simplified block diagram of the system for populating location-based information in accordance with an example of the present invention.

Referring now in more detail to the drawings in which like numerals identify corresponding parts throughout the views, FIG. 1 is a simplified block diagram of the system for populating location-based information in accordance with an example of the present invention. As shown here, the system 100 includes a portable electronic device 102 coupled to an internetwork 135 and a server database 140. In one example, the portable electronic device 102 is wirelessly-connected to both the internetwork 135 and the server database 140. This wireless connection may be arise from a wireless communication technology such as a mobile telecommunications network (e.g. Verizon's 3G network), or via an access point from a wireless local area network (WLAN). According to one example, the portable electronic device 102 includes a global positioning system (GPS) module 110, a software application 114, a microprocessing unit 120, a display unit 116, and a camera module 118. The GPS receiver 110 is configured to calculate the geographic location of the portable electronic device 102 based on signals received from the GPS satellite 122 as will be appreciated by one skilled in the art. In one example of the present invention, software application 114 provides a user interface, which is displayed on the display unit 116, for organizing personal information on the portable electronic device 102. The software application 114 may include a personal information management (PIM) system for creating and storing new contacts, events, or calendar items for example.

The information aggregation and formatting module 130 of the processing unit 120 is configured to receive the location-based information from the internetwork 135 and convert the data into a standard protocol so that the software application 115 can receive the location-based information as an input. More particularly, the formatting module 130 detects the appropriate reference fields from the memory record of the software application 114 and returns the corresponding data thereto. For example, if the reference fields for a new contact include the business address, business name, and phone number, the information aggregation and formatting module 130 would only return properly formatted location-based information relating to these fields to the software application 114. In addition, a camera module 118 may be used for adding location-based information to a photograph taken by the portable electronic device. For example, metadata such as the name of a particular location, user reviews, restaurants, hotels, crime rate, real estate information (e.g. average price of house, rentals, etc.) may be tagged and associated with a captured photograph. Still further, location-based information may also be stored on a server database 140 for retrieval by other users or for obtaining updates to locally-stored location-based information.

Figure 2A:
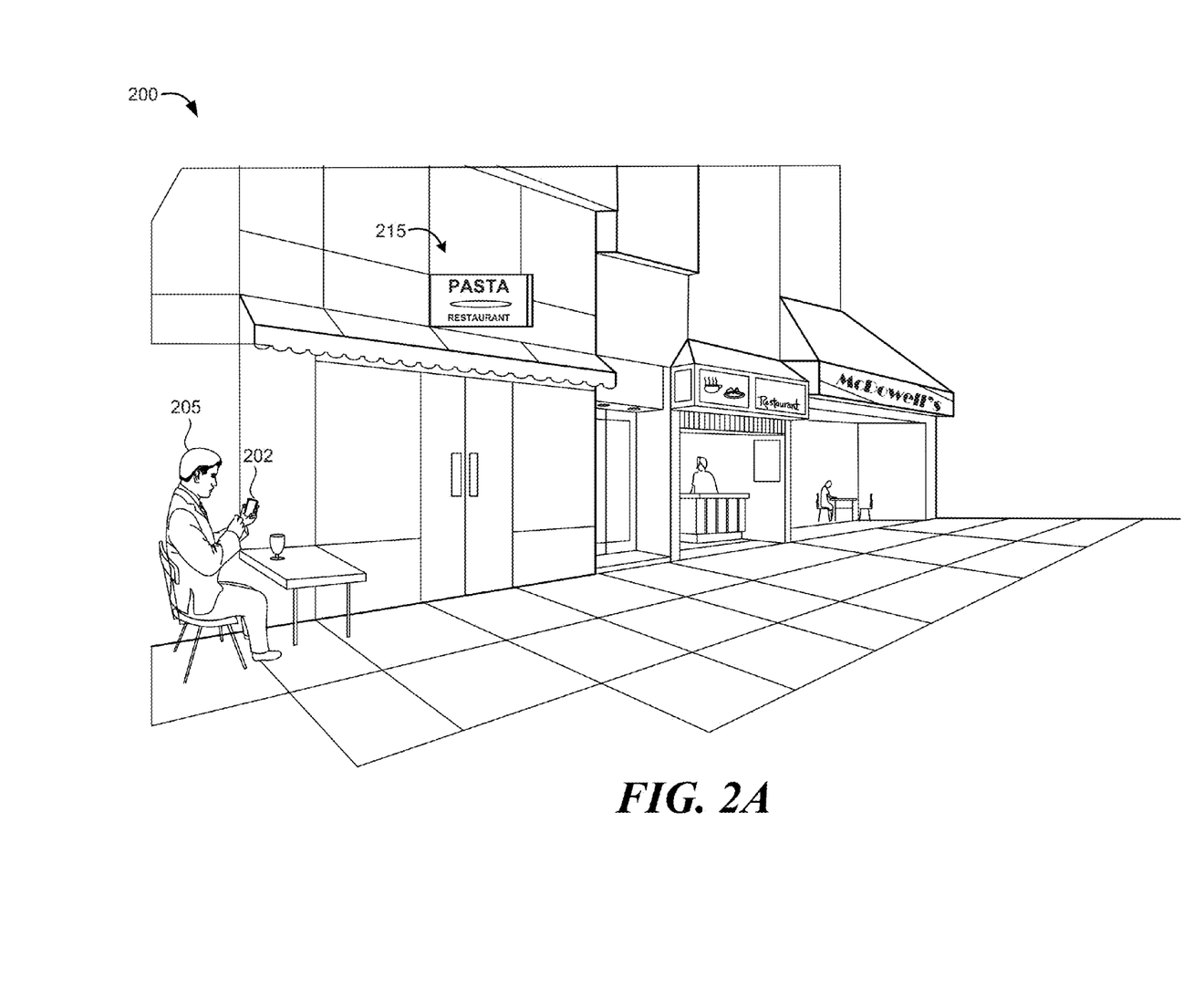

FIG. 2A is a three-dimensional view of an operating environment utilizing the location-based information populating system according to an example of the present invention. As shown here, a user 205 is sitting down at a restaurant 215 operating a portable electronic device 210. If the user 205 would like to hold a future meeting at this location or simply add the restaurant as a new contact, the user 205 may open up a new contact/calendar record and create an event or contact based on the close proximity, or location, of the portable electronic device 202 and restaurant 215. According an example of the present invention, such action will cause the system to pull information like the restaurant name, restaurant phone number, address, business hours, reviews, and any other relevant information that can be discovered via the wirelessly-connected internetwork.

Figure 2B:
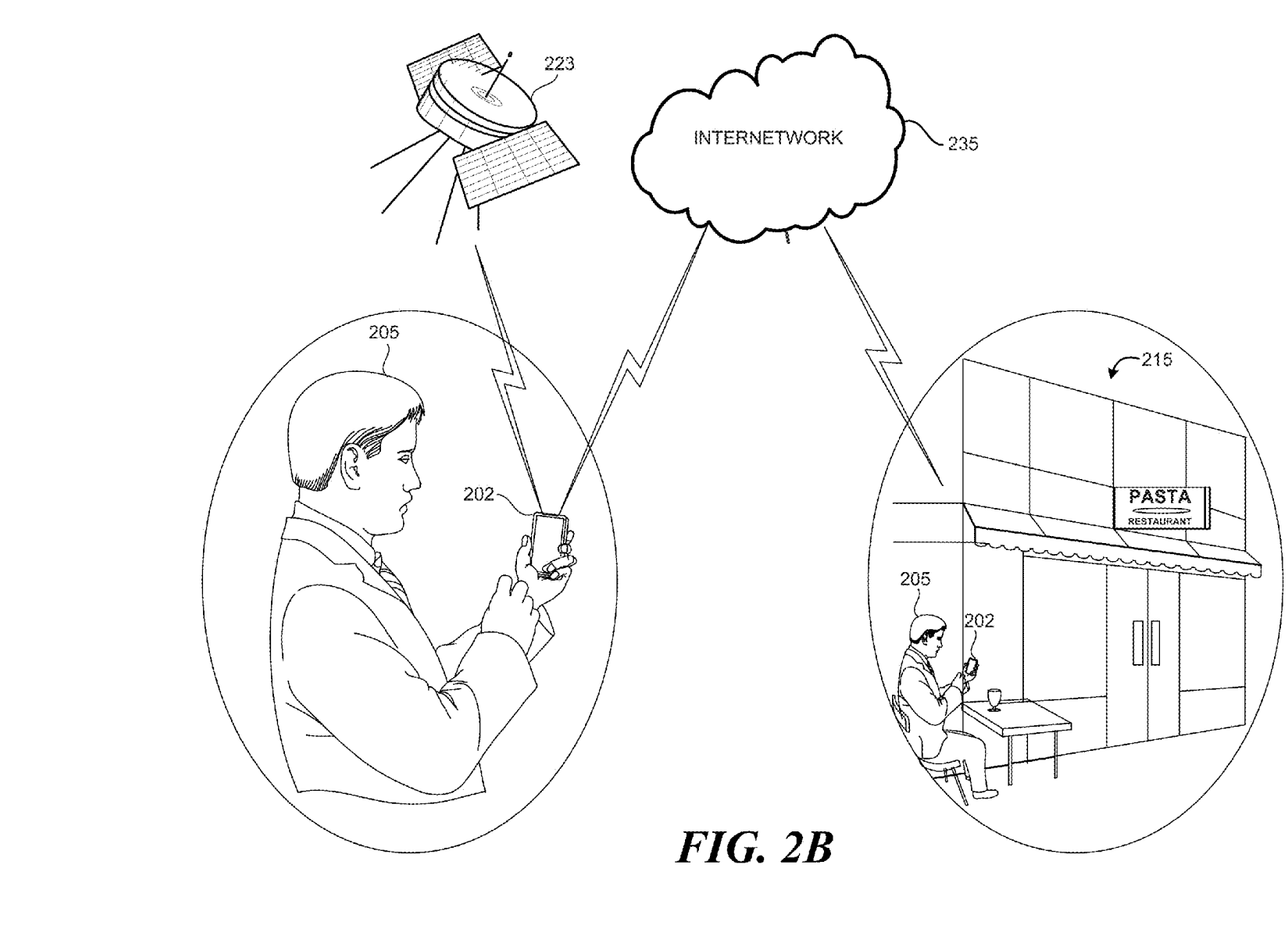
FIG. 2B illustrates the processing steps of the same according to an example of the present invention.

FIG. 2B provides a simplified illustration of the processing steps relating to FIG. 2A according to an example of the present invention. According to the present example, the user 205 accesses the software application running on the portable electronic device 202 in order to create a new contact/event. In response, the GPS receiver of the portable electronic device sends out a signal to the satellite 223 for obtaining the geographic coordinates (using a geographic coordinate system) of the portable electronic device 202. The geographic coordinates of the portable electronic device 202 are then sent to the internetwork 235 for discovering location-based information associated therewith. For example, the latitude and longitude of the geographic coordinates (e.g., 40°41'20" N, 74°2'42.4" W) are analyzed using the internetwork 235 and the closest point of interest is determined. Here, the restaurant 215 is determined to be the closest point of interest relating to the geographic coordinates broadcast by the portable electronic device 202. Accordingly, the internetwork 235 may return all discoverable and relevant location-based information (e.g., business name, address, hours, etc.) to the portable electronic device 202.

Figure 3A:
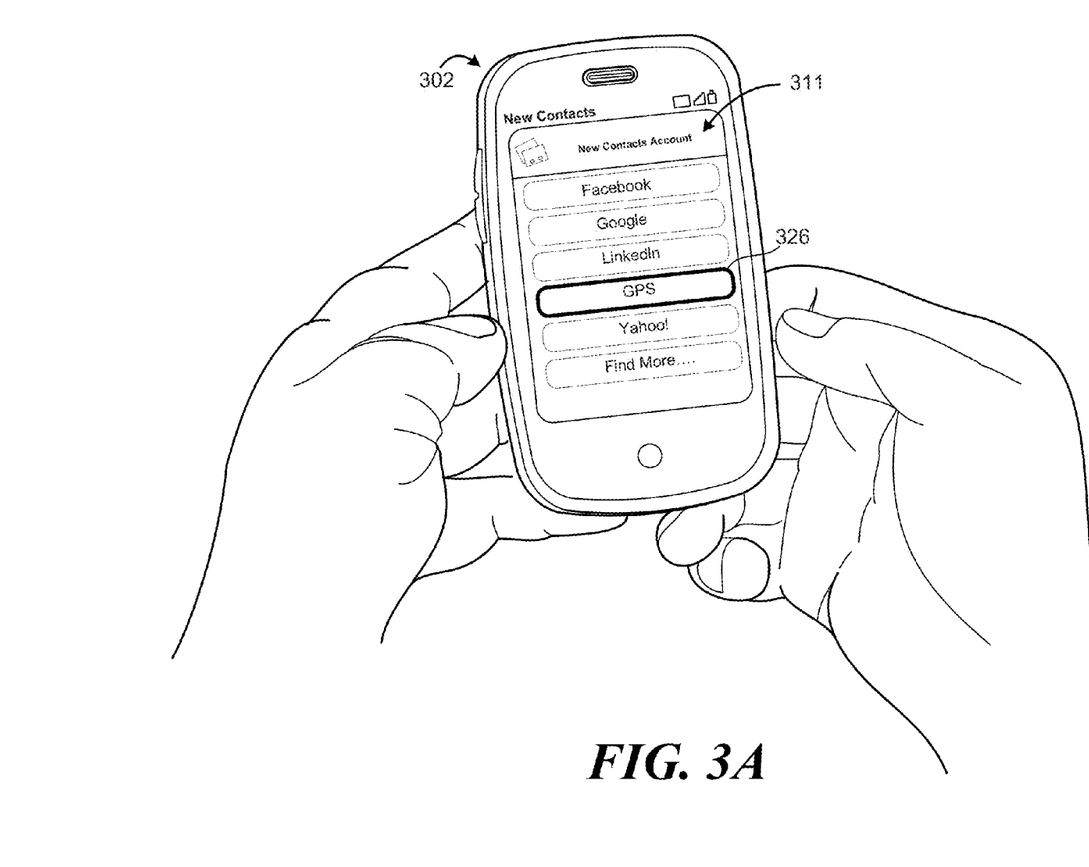
FIG. 3A is a three-dimensional view and screen shot of a user operating a portable electronic device configured to populate location-based information thereon according to an example of the present invention.

FIG. 3A is a three-dimensional view and screen shot of a user operating a portable electronic device configured to populate location-based information thereon according to an example of the present invention. As shown here, the portable electronic device 302 is displaying the user interface 311 of the software application in accordance with an example of the present invention. More particularly, the software application running on the device is set to a "New Contacts" page. As discussed above, the user may create a new memory record involving a contact or event utilizing the user interface associated with the software application. According to one example, the system may automatically retrieve location-based information through user interaction with the "New Contacts" page 311 displayed on the portable electronic device 302. For instance, the user may elect to create new contact based on the current geographic location by selecting the GPS button 326.

Figure 3B:
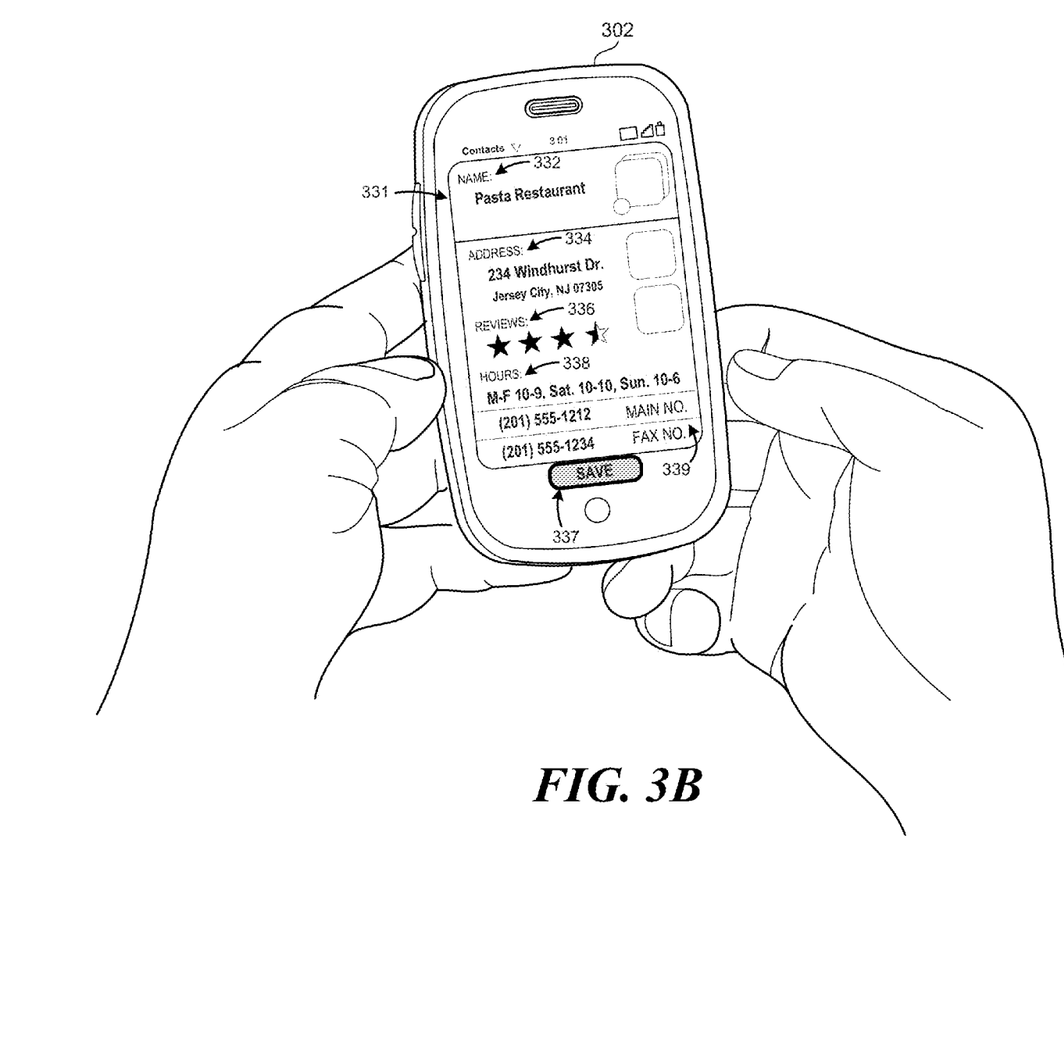
FIG. 3B is another three-dimensional view and screen shot of a user operating a portable electronic device configured to populate location-based information thereon according to an example of the present invention.

FIG. 3B is another three-dimensional view and screen shot of a user operating a portable electronic device configured to populate location-based information thereon according to an example of the present invention. As shown here, the memory record associated with the new contact page 331 includes several reference fields for population of location-based information. For instance, the memory record includes the business name 332, business address 334, reviews 336, hours of operation 338, and phone numbers 339. According to an example of the present invention, upon submitting a request to create a new contact or event, the system attempts to retrieve location-based information relevant to the reference fields associated with the memory record. With respect to the example shown in FIG. 2A, the system may discover, over the internetwork, location-based information such as "Pasta Restaurant" as relevant to the business name reference field 332, an approximate address location as relevant to the business address reference field 336, a particular star rating as relevant to the reviews reference field 336, the known hours of operation for the business hours reference field 338, and the known contact phone numbers for the phone numbers reference field 339. In one example, all of the relevant location-based information is then automatically populated within the corresponding reference fields of the memory record as shown in FIG. 3B. The user may then elect to save the memory record and associated location-based information on the device by pressing the save button 337.

Figure 3C:
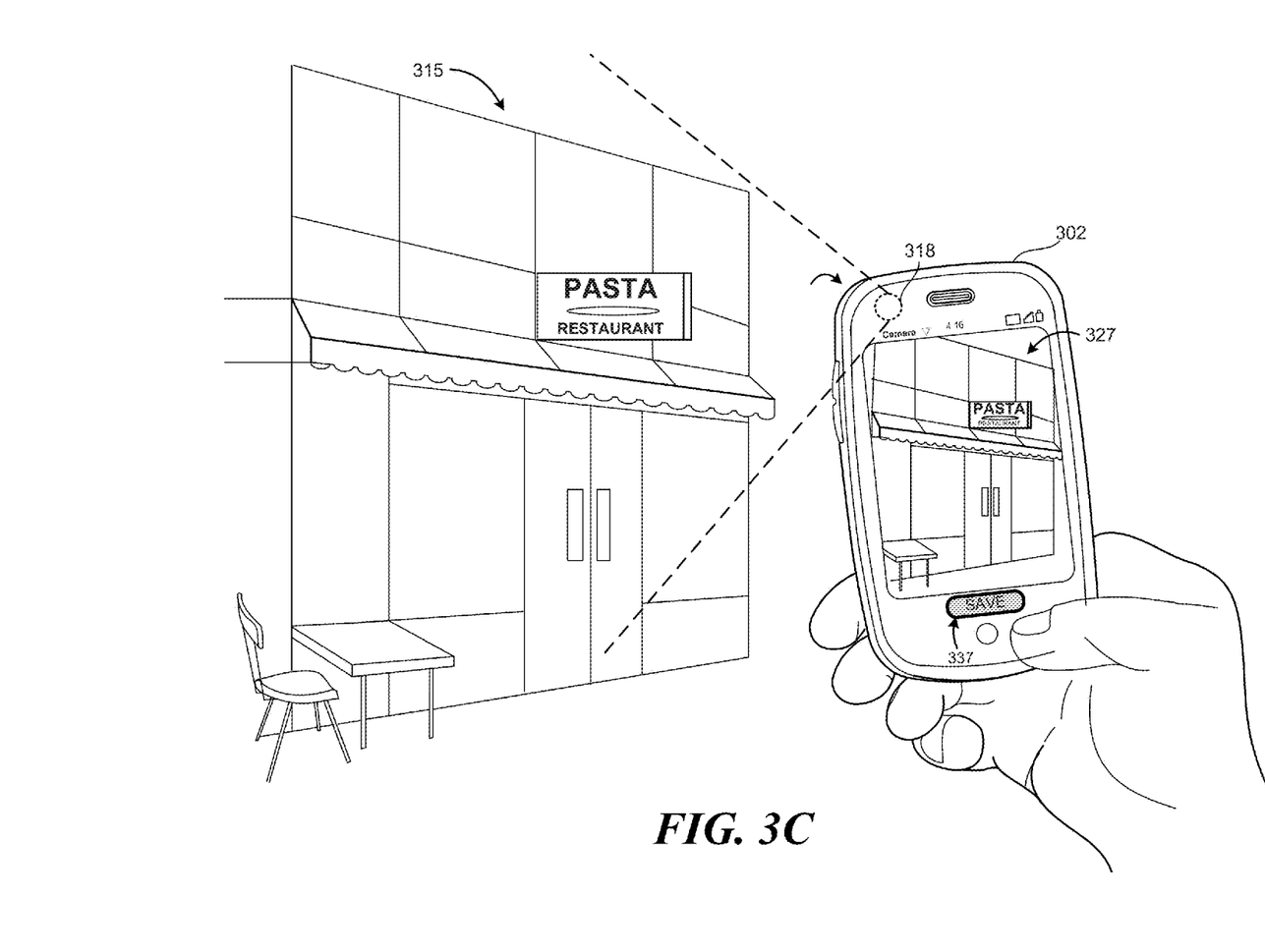
FIG. 3C is yet another three-dimensional view and screen shot of a user operating a portable electronic device configured to populate location-based information thereon according to an example of the present invention.

FIG. 3C is yet another three-dimensional view and screen shot of a user operating a portable electronic device configured to populate location-based information thereon according to an example of the present invention. In this alternate example, a user may obtain location information to be associated with an image taken on the portable electronic device 315. As shown here, the user takes a photograph of the restaurant 315 using the embedded camera 318 of the portable electronic device 302. The photographic image 327 may be analyzed together with the GPS coordinates of the portable electronic device to determine relevant location-based information to be associated with the image 327 as described above. According to one example, relevant information returned by the internetwork is then tagged to the image 327 as metadata. For example, relevant information may include the name of a particular location (e.g., Grand Canyon), user reviews of a hotel, crime rate of a neighborhood, real estate information (e.g. average price of house, rentals, etc.), or the like. In the example shown in FIG. 3C, the restaurant name, business hours, and phone number may be tagged to the image 327 and saved on the portable electronic device 302.

Figure 4:
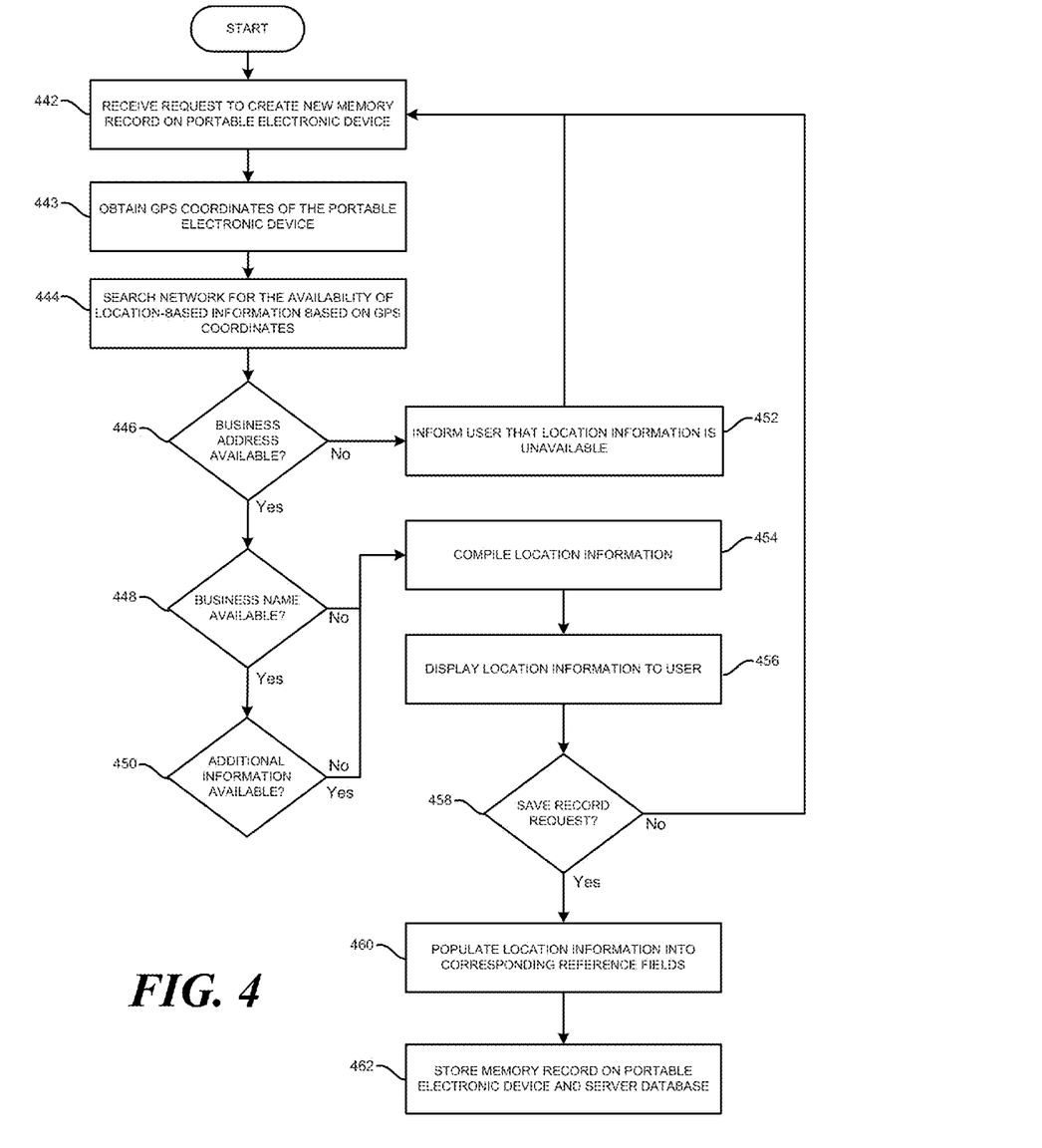
FIG. 4 is a simplified flow chart illustrating the processing steps of the method for populating location-based information according to an example of the present invention.

FIG. 4 is a simplified flow chart illustrating the processing steps of the method for populating location-based information according to an example of the present invention. In step 442, the software application receives a request to create a new memory record on the portable electronic device. As mentioned above, this step may involve the user clicking a button on the device to "open" or "create" a new contact or calendar event. Next, in step 443 the GPS coordinates of the portable electronic device are obtained via the GPS receiver and satellite as detailed above. The internetwork is then searched for any discoverable location-based information associated with the obtained GPS coordinates in step 444. According to one example, if the business address is not available or discoverable on the internetwork in step 446, then the user is informed by the software application that relevant location-based information is unavailable in step 452. On the other hand, if the GPS coordinates are associated with a known business address or point of interest, then additional location-based information is searched for in steps 448 and 450. Once all the relevant location information is retrieved, the information is compiled by the information aggregation and formatting module of the microprocessing unit in step 454. Thereafter, in step 456, the relevant location-based information is displayed to the user for approval. If the user elects to save the location information as a new memory record in step 458, then in step 460, the system automatically populates the location information into the corresponding reference fields as highlighted in FIG. 3B. Lastly, in step 462, the memory record (e.g. contact, event, calendar item) is saved locally on the portable electronic device.

Figure 5:
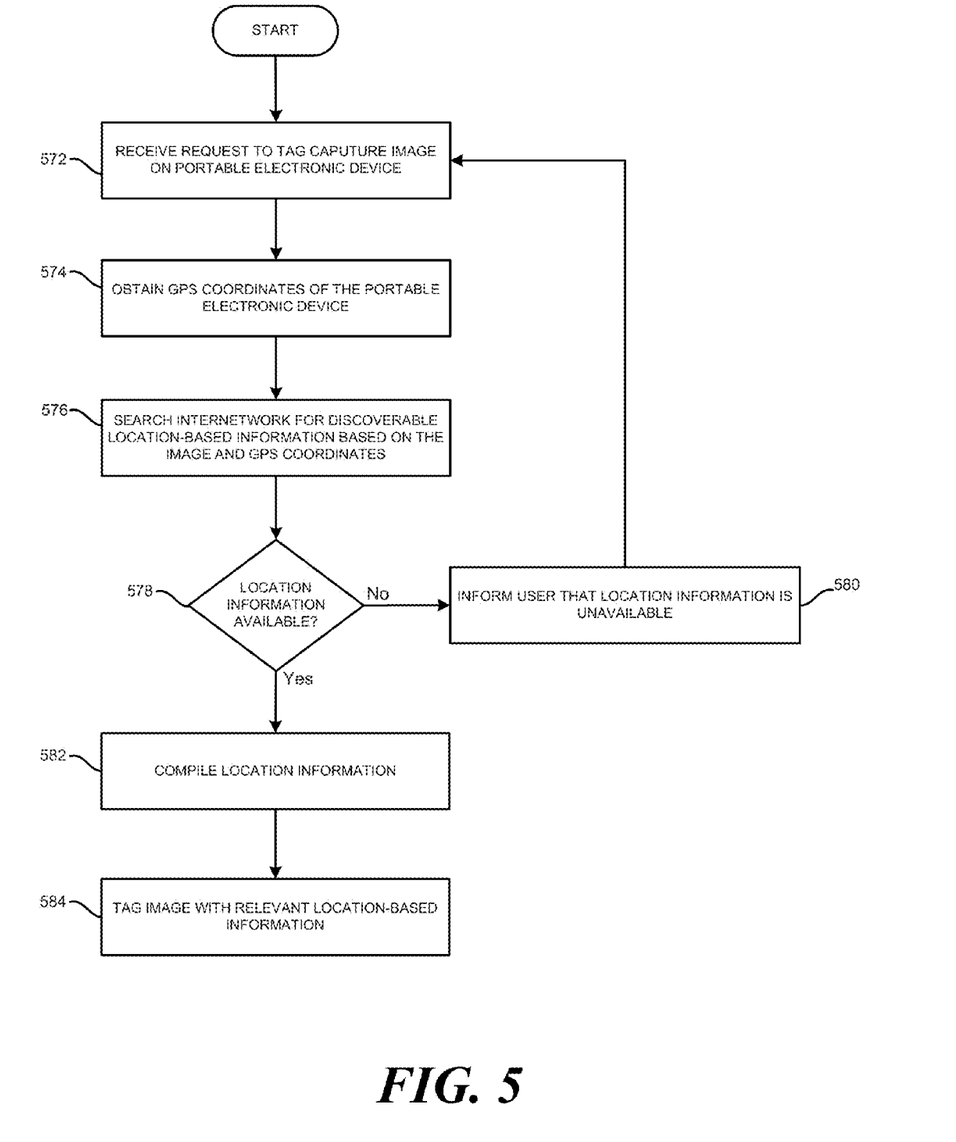
FIG. 5 is a simplified flow chart illustrating the processing steps of another method for populating location-based information according to an example of the present invention

FIG. 5 is a simplified flow chart illustrating the processing steps of another method for populating location-based information according to an example of the present invention. After taking a photograph using the camera feature of the portable electronic device, in step 572 the user submits a request to the software application (i.e. camera application) to tag the newly captured image. Alternatively, the user may manually input the known GPS coordinates of the new image or a previously captured image. Next, in step 574 the GPS coordinates of the portable electronic device are obtained via the installed GPS receiver and satellite as detailed above. Based on the obtained GPS coordinates and analysis of the image, the internetwork is searched for any discoverable and relevant location-based information to be associated with the nearest point of interest. For example, a tag request for a photograph of the Statue of Liberty may return the name of the monument along with the known visiting hours and historical/physical information (e.g., year built, height, etc.). More particularly, if a particular point of interest cannot be immediately determined based on the GPS coordinates alone, an analysis of the photographic image may help the system determine that the Statue of Liberty is the desired point of interest. If no information is available, however, then the system informs the user accordingly in step 580. Otherwise, the microprocessing unit compiles the location information discovered by the internetwork in step 582 and automatically populates or tags the image with the compiled location information in step 584.

Figure 6:
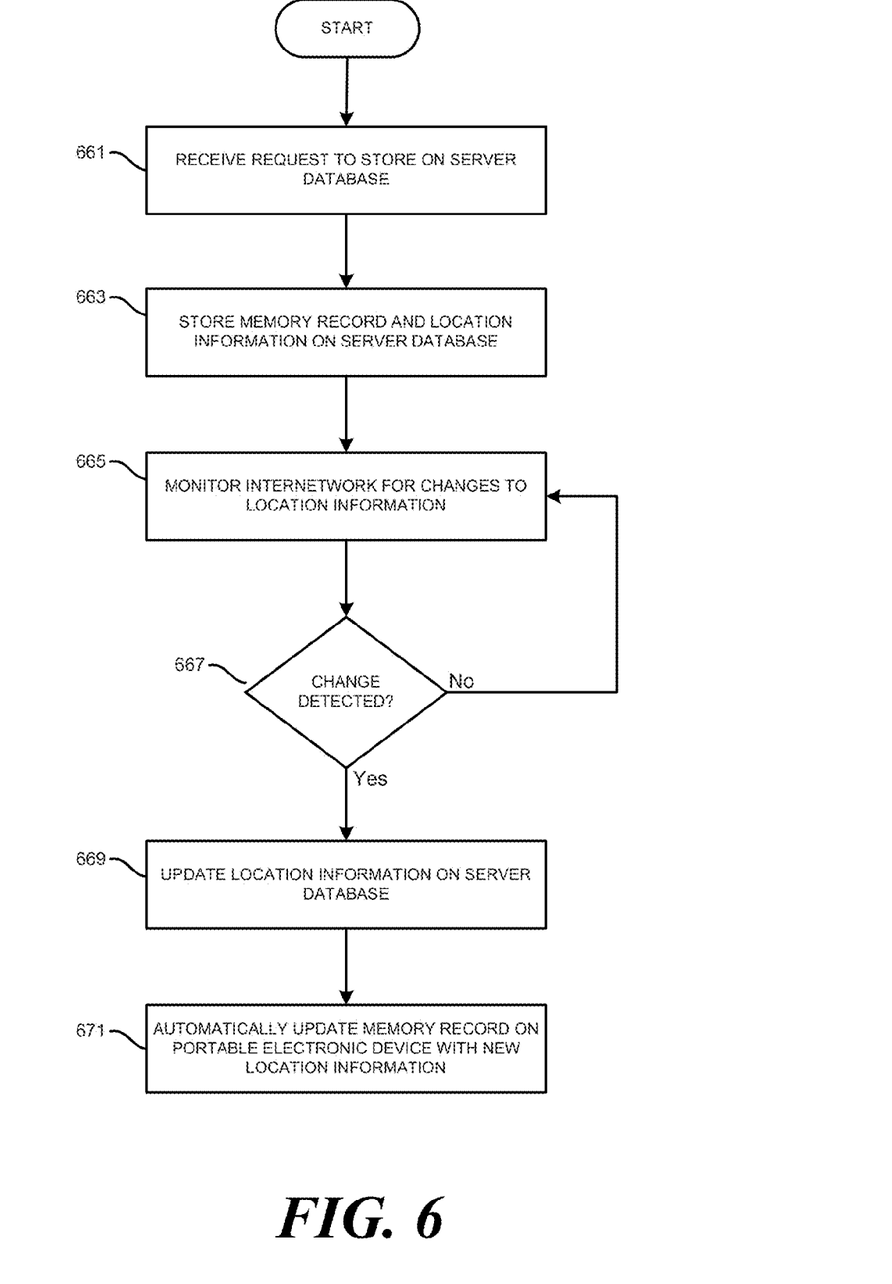
FIG. 6 is a simplified flow chart illustrating the processing steps of yet another method for populating location-based information according to an example of the present invention

FIG. 6 is a simplified flow chart illustrating the processing steps of yet another method for populating location-based information according to an example of the present invention. In step 661, the user may submit a request to store the memory record and associated location-based information on the server database via the wireless network. Alternatively, the request may be submitted automatically upon the user saving the memory record and location information locally on the portable electronic device. Accordingly, in step 663, the memory record and location-based information is stored on the server database. In step 665, software running on the server database monitors the internetwork for changes to the location-based information associated with a particular memory record. If a change is detected in step 667, then the location information is updated on the server database in step 669. Next, in step 671, the memory record and appropriate reference fields are automatically populated and updated on the portable electronic device. For example, if the business hours of operation of a particular restaurant stored on a memory record has changed, then the reference field of the memory record relating to business hours is updated on both the server database, and in turn, on the portable electronic device.

Many advantages are afforded by the method and system of populating location-based information according to the examples of the present invention. For instance, since the reference fields of the memory record are automatically populated, an efficient and robust data entry method is provided for the user. In addition, the user does not have to manually search for each piece of relevant information as all relevant information is automatically discovered and pulled from the internetwork. Furthermore, stored information (i.e. memory record) is continuously updated so as to provide the user with the most current and relevant information at all times. As a result, management of personal information becomes less complex and involved, thereby increasing the user's time management and personal productivity.

Furthermore, while the invention has been described with respect to exemplary embodiments, one skilled in the art will recognize that numerous modifications are possible. For example, although particular examples depict a smartphone as the portable electronic device, the invention is not limited thereto. For example, the portable electronic device may be a netbook, a tablet personal computer, a portable media player, or any other electronic device having a GPS receiver and configured for wireless network connectivity.

Furthermore, the memory record may include additional reference fields not depicted or described above. For example, reference fields may include details such as types of payments accepted at a particular establishment (e.g., credit card, paypal, etc.), reservation details for a restaurant (e.g., wait time, open table, etc.), and the like. Still further, instead of PIM-related actions the software application may comprise of a video game in which actual building and street names are populated on the display using the camera and GPS coordinates of the portable electronic device. Thus, although the invention has been described with respect to exemplary embodiments, it will be appreciated that the invention is intended to cover all modifications and equivalents within the scope of the following claims.

What is claimed is:

1. A method for populating data on a portable electronic device connected to a network, the method comprising:
   receiving a user request to create a new memory record on the portable electronic device, wherein the new memory record represents a personal information management (PIM) item and includes a plurality of reference fields to be populated and stored;
   identifying a proximate point-of-interest based on a geographic location of the portable electronic device;
   determining relevant location information of said point-of-interest that corresponds with at least a subset of the plurality of reference fields to be populated;
   automatically populating and storing, in response to said user request, said reference fields to be populated of the memory record with the corresponding relevant location information;
   displaying the relevant location information on the portable electronic device;
   receiving a request from the user to save the memory record and the relevant location information;

storing the memory record on the portable electronic device;

storing the relevant location information on a database server;

monitoring the network for changes to the relevant location information stored in the database server; and updating, automatically, the reference fields of the memory record stored on the portable electronic device to correspond with the updated location information.

2. The method of claim 1, wherein the step of determining relevant location information further comprises:

searching the network for the availability of relevant location information; and compiling the relevant location information received from the network.

3. The method of claim 2, wherein the step of displaying the relevant location information further comprises:

reformatting the relevant location information based on a format of the reference fields of the memory record.

4. The method of claim 1, wherein the memory record is a personal information management (PIM) contact item and the reference fields of the record includes address information, business name, phone number, business hours, and/or reviews.

5. The method of claim 1, wherein the memory record is a PIM calendar item and the reference fields of the record includes address information, business name, event time, and/or phone number.

6. A system comprising:

a portable electronic device connected to a network and operated by a user;

a global positioning system (GPS) module coupled to the portable electronic device and configured to transmit location data of the portable electronic device; and a software application running on the portable electronic device and configured store a memory record thereon, wherein the memory record is a personal information management (PIM) item and includes a plurality of reference fields to be populated and stored, wherein upon receiving request for creating a new memory record, a point-of-interest along with relevant location information of said point-of-interest are determined from the network based on the location data of the electronic device such that reference fields to be populated and corresponding to the relevant location information are automatically populated and stored and displayed to the operating user; and a server database for storing the memory record, wherein the server database is configured to monitor the network for changes to the relevant location information stored therein and automatically update the reference fields of the memory record stored on the portable electronic device to correspond with the changes in the relevant location information.

7. The system of claim 6, wherein the portable electronic device includes a central processing unit configured to search the network for the availability of relevant location information and compile the relevant location information received from the network.

8. The system of claim 7, further comprising:

a camera module coupled to the portable electronic device and configured to capture a photographic image, wherein the location data and the image are analyzed for determining relevant location information to be associated with the image.

9. The system of claim 6, wherein the portable electronic device is a smartphone device, personal digital assistant, tablet portable computer, or notebook computer.

10. The system of claim 6, wherein the memory record is a personal information management (PIM) contact item and the reference fields of the record includes address information, business name, phone number, business hours, and/or reviews.

11. The system of claim 6, wherein the memory record is a PIM calendar item and the reference fields of the record includes address information, business name, event time, and phone number.

* * * * *